(12) United States Patent
Guduru et al.

(10) Patent No.: US 12,192,827 B2
(45) Date of Patent: Jan. 7, 2025

(54) SYSTEMS AND METHODS FOR DYNAMIC MAXIMUM TRANSMISSION UNIT ADJUSTMENT IN A WIRELESS NETWORK

(71) Applicant: Verizon Patent and Licensing Inc., Basking Ridge, NJ (US)

(72) Inventors: Vijayakrishna P. Guduru, Denville, NJ (US); Sudhakar Reddy Patil, Flower Mound, TX (US); Anthony Clay Reynolds, Rhome, TX (US); Jerry Steben, Forth Worth, TX (US)

(73) Assignee: Verizon Patent and Lic ensing Inc., Basking Ridge, NJ (US)

( * ) Notice: Subject to any disclaimer, the term of this patent is extended or adjusted under 35 U.S.C. 154(b) by 383 days.

(21) Appl. No.: 17/653,327

(22) Filed: Mar. 3, 2022

(65) Prior Publication Data
US 2023/0284089 A1    Sep. 7, 2023

(51) Int. Cl.
*H04W 28/06* (2009.01)
*H04L 47/36* (2022.01)
*H04W 28/02* (2009.01)

(52) U.S. Cl.
CPC .......... *H04W 28/06* (2013.01); *H04L 47/365* (2013.01); *H04W 28/0268* (2013.01)

(58) Field of Classification Search
CPC . H04W 28/06; H04W 28/0268; H04W 28/24; H04L 47/365
See application file for complete search history.

(56) References Cited

U.S. PATENT DOCUMENTS

| 11,627,092 B2 * | 4/2023 | Sivaraj | H04L 47/365 370/229 |
| 2007/0171828 A1 * | 7/2007 | Dalal | H04L 47/365 370/252 |

(Continued)

FOREIGN PATENT DOCUMENTS

CN    114205308 A  *  3/2022    ........... H04L 41/145

OTHER PUBLICATIONS

ETSI "Digital cellular telecommunications system (Phase 2+) (GSM); Universal Mobile Telecommunications System (UMTS); General Packet Radio Service (GPRS); Service description; Stage 2 (3GPP TS 23.060 version 16.0.0 Release 16)", ETSI TS 123 060 V16.0.0 (Nov. 2020), pp. 240-242, 278-280 and 365 (Year: 2020).*

(Continued)

*Primary Examiner* — Shah M Rahman

(57) ABSTRACT

A system described herein may identify a requested communication session between a UE and a network, such as a core of a wireless network. The system may identify Quality of Service ("QoS") information associated with the UE and/or the requested communication session. The QoS information may include or may be based on a network slice identifier, a QoS value, a Service Level Agreement ("SLA"), one or more models associated with UE attributes, or other suitable information. The system may determine a maximum transmission unit ("MTU") configuration for the UE based on the identified QoS information and/or models that associate UE attributes to MTU configurations. The system may implement the determined MTU configuration, including providing the MTU configuration to one or more gateways or endpoints of the network and/or to the UE. The UE and the network may accordingly use the MTU configuration when communicating via the requested communication session.

20 Claims, 12 Drawing Sheets

(56) References Cited

U.S. PATENT DOCUMENTS

| | | | |
|---|---|---|---|
| 2012/0110115 A1* | 5/2012 | Lin .................... | H04L 65/1089 709/217 |
| 2013/0021965 A1* | 1/2013 | Chu ................... | H04W 28/065 370/328 |
| 2015/0229970 A1* | 8/2015 | Ma ....................... | H04L 65/762 370/328 |
| 2017/0041922 A1* | 2/2017 | Chen .................... | H04L 1/0031 |
| 2018/0317108 A1* | 11/2018 | Schmidt ............. | H04L 43/0852 |
| 2019/0191330 A1* | 6/2019 | Dao .................... | H04L 12/4633 |
| 2020/0359244 A1* | 11/2020 | Yao ....................... | H04W 24/10 |
| 2021/0168090 A1* | 6/2021 | Momchilov ............ | H04L 47/36 |
| 2022/0022228 A1* | 1/2022 | Wang ...................... | H04W 4/46 |
| 2023/0155948 A1* | 5/2023 | Balasubramanian ... | H04L 47/10 370/235 |
| 2023/0199221 A1* | 6/2023 | Stoica .................... | H04N 19/89 375/240.27 |
| 2023/0262007 A1* | 8/2023 | Novlan ................ | H04L 47/781 |
| 2023/0353455 A1* | 11/2023 | Zhu ..................... | G06F 9/45558 |

OTHER PUBLICATIONS

Zhang, Xincheng, "Traffic Model of Smartphone and Optimization", Wiley-IEEE Press, LTE Optimization Engineering Handbook, 2017, pp. 360-381 (Year: 2017).*

ETSI TS 129 274 V13.9.0, "Universal Mobile Telecommunications System (UMTS); LTE; 3GPP Evolved Packet System (EPS); Evolved General Packet Radio Service (GPRS) Tunnelling Protocol for Control plane (GTPv2-C); Stage 3 (3GPP TS 29.274 version 13.9.0 Release 13)" (Mar. 2017).

* cited by examiner

SYSTEMS AND METHODS FOR DYNAMIC MAXIMUM TRANSMISSION UNIT ADJUSTMENT IN A WIRELESS NETWORK

BACKGROUND

Wireless networks, such as radio access networks ("RANs"), may be used to wirelessly communicate with various types of User Equipment ("UEs"), such as wireless phones, Internet of Things ("IoT") devices, fixed wireless access ("FWA") devices, or other types of devices. Additionally, wireless networks may be used for different types of applications or traffic, such as for voice calls, videoconferencing sessions, gaming sessions, IoT device monitoring, etc. Wireless networks may utilize messaging protocols in which a maximum transmission unit ("MTU") defines the largest size of a data packet network UEs and the wireless networks.

BRIEF DESCRIPTION OF THE DRAWINGS

FIG. 2 illustrates an example arrangement of physical resources associated with a RAN in the time and frequency domains;

DETAILED DESCRIPTION OF EXAMPLE EMBODIMENTS

The following detailed description refers to the accompanying drawings. The same reference numbers in different drawings may identify the same or similar elements.

Embodiments described herein provide for the dynamic adjustment of maximum transmission unit ("MTU") parameters in a network, such as a wireless network. Such MTU parameters may specify a maximum size (e.g., in bytes, bits, etc.) of a data packet or other transmission unit for communications between a UE and the wireless network.

The adjustment of MTU sizes, in accordance with embodiments described herein, may include adjusting MTU sizes for different QoS parameters, Service Level Agreements ("SLAs"), network slices, traffic or application types (e.g., voice traffic, content streaming traffic, data traffic, etc.), UE location, and/or based on other factors. In some embodiments, the same UE may be associated with different MTU configurations for different sessions (e.g., concurrently active or established sessions). In some embodiments, such criteria may be modeled using modeling techniques such as artificial intelligence/machine learning ("AI/ML") techniques or other suitable techniques, and may be predictively or proactively applied to communication sessions between one or more UEs and one or more networks.

Modifying MTU parameters associated with a particular UE may allow for fine tuning, adjusting, etc. of communication channels between the UE and the network, in order to improve the user experience of users sending or receiving traffic via such UE. For example, adjusting the MTU parameters to a particular size may serve to optimize efficiency and/or achieve QoS thresholds, SLAs, etc. Additionally, or alternatively, adjusting MTU parameters may reduce fragmentation (e.g., in situations where relatively large amounts of data are to be sent, such as streaming content, large file transfers, etc.), reduce the incidence of dropped packets or other errors, and/or may otherwise enhance communications between UEs and networks. Further, the adjustment of MTU parameters for a UE may allow for the adjustment of MTU sizes associated with the UE without needing to modify the MTU parameters associated with other UEs that are communicatively coupled to the same network, thus allowing for granular control of MTU parameters on a per-UE or per-UE group basis.

Figure 1:
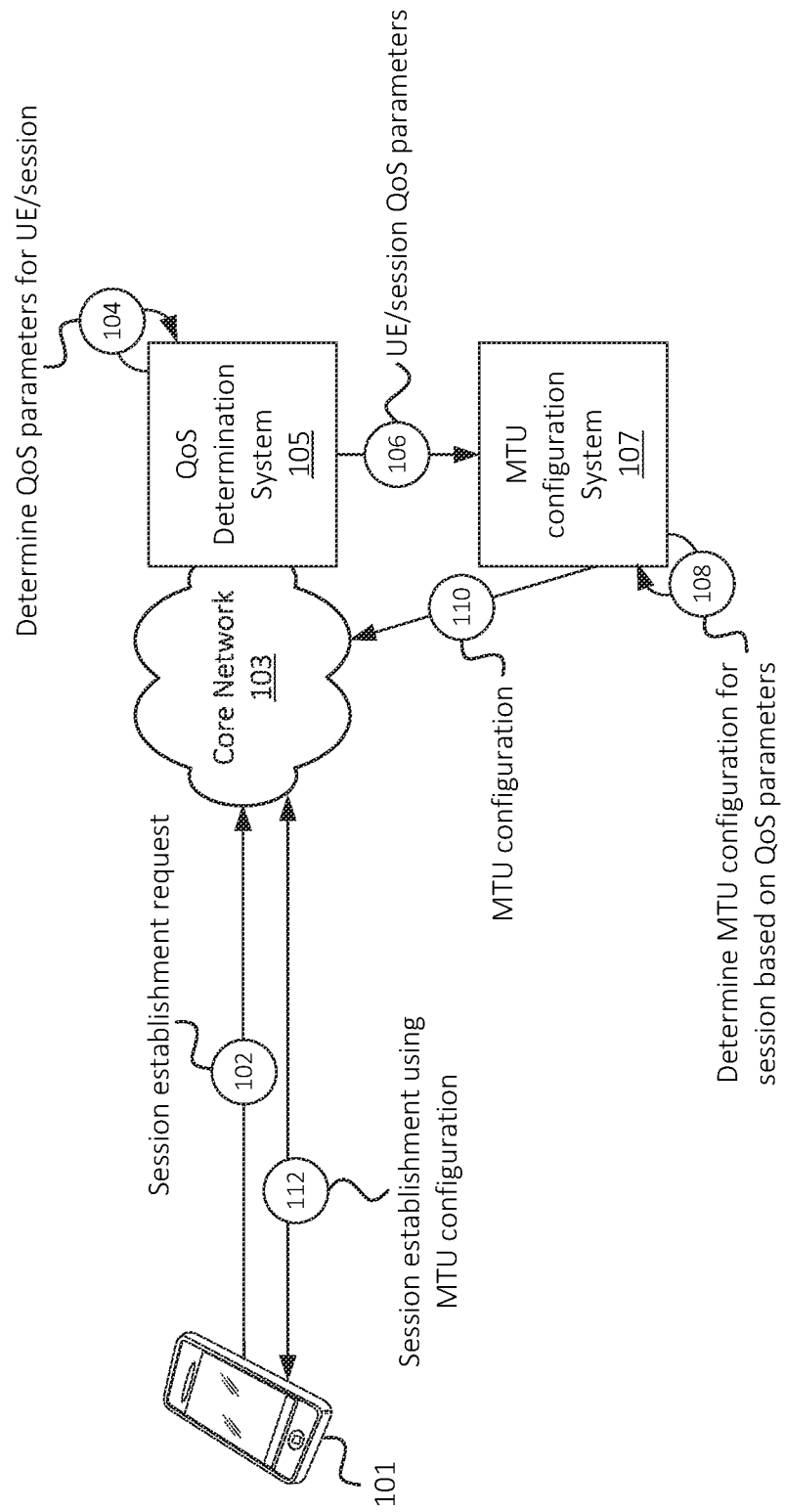
FIGS. 1 and 2 illustrate an example overview of one or more embodiments described herein.

As shown in FIG. 1, UE 101 may be communicatively coupled to core network 103. Core network 103 may be, for example, a Fifth Generation ("5G") core ("5GC") network, a Long-Term Evolution ("LTE") Evolved Packet Core ("EPC"), or some other type of core network. UE 101 may be communicatively coupled to core network 103 via a RAN, which may include one or more base stations (e.g., a Next Generation Node B ("gNB"), an evolved Node B ("eNB"), etc.) or other type of wireless network infrastructure. As such, although not explicitly shown in this figure, communications between UE 101 and core network 103 may be communicated via one or more RANs or other types of networks.

UE 101 may include a wireless phone, an IoT device, a Machine-to-Machine ("M2M") device, an FWA device, or other suitable type of device that communicates wirelessly with core network 103 via one or more RANs. Core network 103 may provide routing services, call or session management services, traffic processing services, or other services to UE 101. Core network 103 may be associated with one or more network slices, where different slices provide differentiated levels of service, such as service in accordance with different QoS parameters.

UE 101 may output (at 102) a session establishment request to core network 103. For example, such request may be based on a voice call placed by UE 101, the initiation of a file transfer, a request to view streaming content, etc. While examples herein are provided in the context of a session establishment request being received from UE 101, similar concepts may be applied to situations in which core network 103 receives a session request associated with UE 101 from another source, and/or determines in some other manner that a session request should be established between core network 103 and UE 101 (e.g., based on an incoming voice call for UE 101, a "push" message sent to UE 101, etc.). In some embodiments, similar concepts may be applied to modify already established sessions between UE 101 and core network 103. For example, one or more elements of core network 103 and/or some other device or system may determine that an MTU configuration of an existing session should be changed, in accordance with embodiments described herein.

In some embodiments, the requested session may include a protocol data unit ("PDU") session, an Internet Protocol ("IP") session, a Transmission Control Protocol ("TCP") session, a user plane data session, and/or some other type of session. In some embodiments, the requested session may refer to a session at a network layer, a transport layer, an application layer, and/or some other suitable layer. The requested communication session may be associated with one or more network slices, SLAs, QoS parameters, Access Point Names ("APNs"), or the like, which may indicate particular performance metrics, thresholds, goals, etc. (e.g., minimum acceptable throughput, maximum acceptable latency, etc.) for the requested session.

In accordance with some embodiments, QoS Determination System ("QDS") 105 may identify the requested establishment (at 102) of one or more communication sessions between UE 101 and core network 103. In some embodiments, QDS 105 may be, may be implemented by, and/or may be communicatively coupled to one or more elements of core network 103, such as a Session Management Function ("SMF"), a User Plane Function ("UPF"), a Policy Control Function ("PCF"), or the like. Additionally, or alternatively, QDS 105 may be external to core network 103, and may receive an indication of the session establishment request (at 102) from a Network Exposure Function ("NEF"), a Service Capability Exposure Function ("SCEF"), or other interface associated with core network 103. In some embodiments, the information regarding the one or more communication sessions may include an indication of QoS thresholds, SLAs, network slices, etc. with which the requested communication session is associated. Such indications may include an index or reference to a mapping of QoS thresholds, SLAs, etc. In some embodiments, such index or reference may include a Network Slice Selection Assistance Information ("NSSAI") value, a 5G QoS identifier ("5QI") value, or other suitable value.

In some embodiments, QDS 105 may receive information regarding UE 101 from a Unified Data Management function ("UDM"), a Home Subscriber Server ("HSS"), or some other device or system that maintains information regarding UE 101. Such UE information may include a device type of UE 101 (e.g., mobile telephone, IoT device, M2M device, etc.), attributes of UE 101 (e.g., UE power class, battery level, processor speed, etc.), slice authorization information (e.g., an indication of network slices that UE 101 is authorized to access), SLA information (e.g., indicating one or more SLAs, QoS thresholds, etc.), or other suitable UE information.

QDS 105 may determine (at 104) QoS parameters for UE 101 and/or for the requested session associated with UE 101 and core network 103. For example, QDS 105 may determine such QoS parameters based on information regarding the requested communication session and/or UE 101, as discussed above. The QoS parameters may include and/or may be based on performance thresholds, traffic or application type (e.g., voice traffic, content streaming traffic, etc.), or other suitable parameters. In some embodiments, as described further below, QDS 105 may maintain one or more models, mappings, etc. based on which a particular set of QoS parameters may be determined (at 104) based on UE information, network slice information, session information, or other suitable information.

QDS 105 may provide (at 106) the determined QoS parameters for the session and/or for UE 101 to MTU configuration system ("MCS") 107. MCS 107 may be incorporated in, implemented by, and/or may be communicatively coupled to one or more elements of core network 103, such as an SMF, AMF, etc. In some embodiments, MCS 107 may be communicatively coupled to such elements of core network 103 and/or to UE 101 via an application programming interface ("API") or other suitable communication pathway.

MCS 107 may determine (at 108) an MTU configuration for UE 101 based on the QoS parameters received (at 106) from QDS 105. For example, MCS 107 may determine the MTU configuration based on UE attributes, session parameters, network slice, etc., discussed above. As one example, MCS 107 may determine the MTU configuration based on a mapping between session QoS parameters and MTU configurations. As discussed below with respect to FIGS. 3-5, MCS 107 may maintain one or more data structures which include mappings between particular QoS parameters or other parameters and respective MTU configurations. Additionally, or alternatively, as discussed below with respect to FIG. 6, MCS 107 may generate, refine, identify, etc. one or more models, classifications, associated with UE 101 and/or the requested session, and may determine a suitable MTU configuration based on such models, classifications, etc.

MCS 107 may provide (at 110) the determined MTU configuration for UE 101 to core network 103. For example, MCS 107 may provide the MTU configuration to an SMF, AMF, and/or other device or system of core network 103 that facilitates or handles the establishment of communication sessions between UE 101 and core network 103. Accordingly, core network 103 and UE 101 may complete (at 112) the session establishment using the determined MTU configuration as determined by MCS 107. The MTU configuration may, for example, include a maximum MTU size for communications between UE 101 and core network 103 via the established communication session.

The dynamic determination (at 108) of the MTU configuration based on QoS parameters, UE information, etc. may serve to optimize performance, robustness, etc. of communications between UE 101 and core network 103. For example, in situations where the communication session is associated with relatively large data sizes and/or ongoing communications, such as content streaming, file transfers, etc., the MTU configuration may include a relatively large MTU size, where the large MTU size may result in a lower measure of fragmentation and reduced overhead as compared to a smaller MTU size. On the other hand, when the communication session is associated with relatively small data sizes, intermittent communications, time-sensitive (e.g., low-latency) communications, such as IoT monitoring information, text messaging, etc., the MTU configuration may include a relatively small MTU size, where the small MTU size may result in reduced latency, lower likelihood of dropped packets, etc. In other words, different MTU configurations may be used in order to meet differing goals, SLAs, QoS thresholds, etc.

Figure 2:
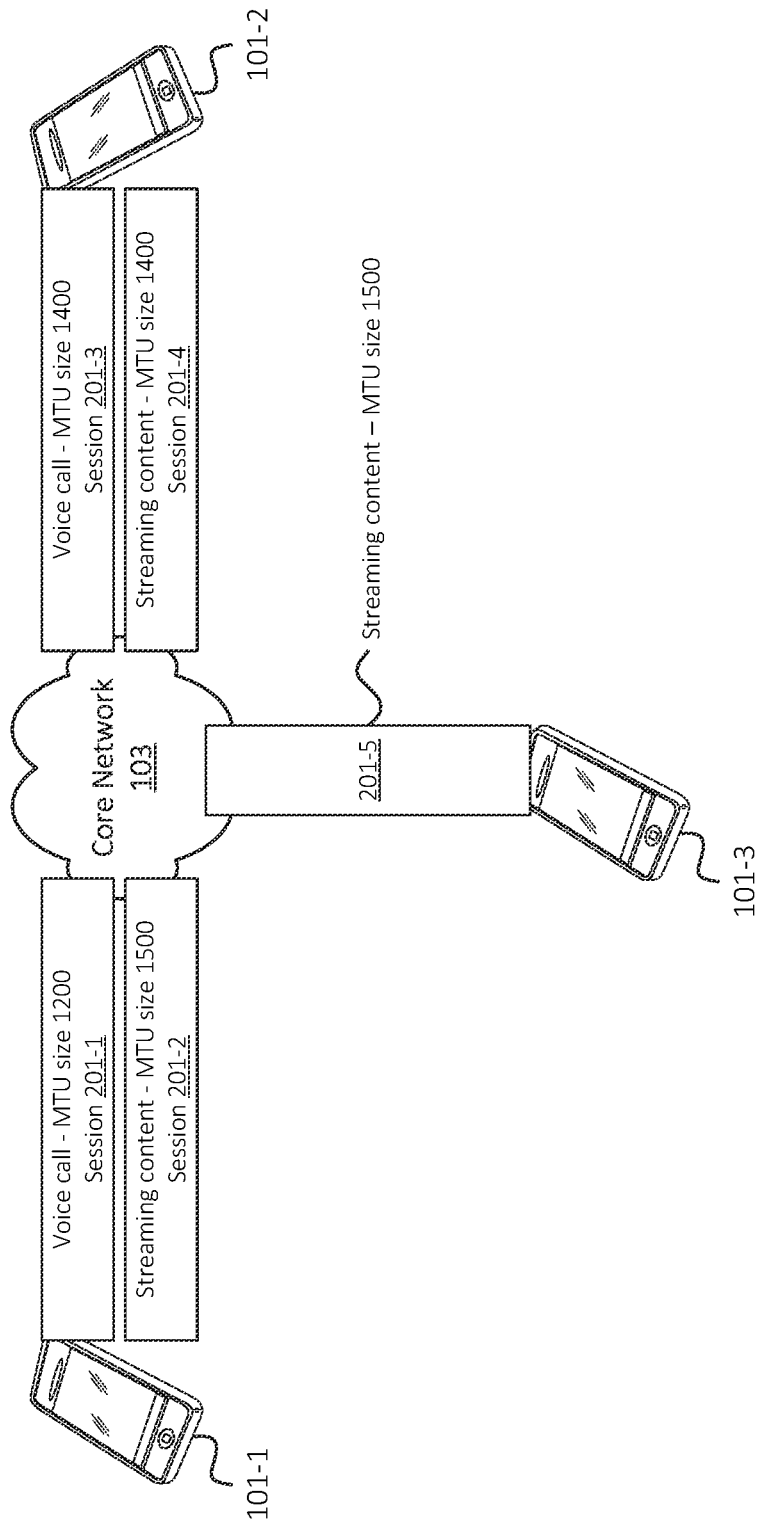

For example, as shown in FIG. 2, different communication sessions 201 between different UEs 101 and core network 103 may be established. In accordance with some embodiments, the different communication sessions 201 may be associated with different MTU configurations, such as different MTU sizes. In some embodiments, the same UE 101 may be associated with different MTU configurations for different communication sessions. For instance, a first UE 101-1 may be associated with two example communication sessions 201-1 (e.g., a voice call communication session) and 201-2 (e.g., a streaming content communication session). UE 101-1 and core network 103 may have performed a first session establishment procedure to establish session 201-1, and a second session establishment procedure to establish session 201-2. As similarly discussed above, for each of these procedures, MCS 107 (and/or one or more other devices or systems, such as QDS 105, an SMF, an AMF, etc.) may have determined one or more QoS parameters, network slices, APNs, traffic types, and/or other information associated with UE 101 and/or with sessions 201-1 and 201-2, and may have identified respective MTU configurations for sessions 201-1 and 201-2 based on such information. Thus, in this example, session 201-1 is associated with a first MTU configuration (e.g., an MTU size of 1200 bytes) and session 201-2 is associated with a second MTU configuration (e.g., an MTU size of 1500 bytes). That is, communication sessions 201-1 and 201-2 may both be concurrently active, established, provisioned, etc., where such communication sessions 201-1 and 201-2 are associated with different MTU configurations.

As further shown, UE 101-2 may be associated with sessions 201-3 and 201-4. In this example, sessions 201-3 and 201-4, associated with UE 101-2, may respectively be associated with a same traffic type as sessions 201-1 and 201-2 associated with UE 101-1. For example, sessions 201-1 and 201-3 may be associated with voice call traffic, while sessions 201-2 and 201-4 may be associated with streaming content traffic. Although the traffic types associated with these sessions are the same for UEs 101-1 and 101-2, the MTU configurations for these sessions may be different. For example, the MTU configuration associated with session 201-3 may include an MTU size of 1400, which is different from the MTU size of 1200 associated with session 201-1. Similarly, the MTU configuration associated with session 201-4 may include an MTU size of 1400, which is different from the MTU size of 1500 associated with session 201-2.

As shown in this example, the MTU configurations for different traffic types or other parameters may, in some situations, be the same MTU configuration. That is, there is no requirement according to embodiments discussed herein that different traffic types (or other parameters) are associated with different MTU configurations. For example, sessions 201-3 and 201-4, associated with different traffic types, are associated with the same MTU size. As additionally shown, a third UE 101-3 may be associated with communication session 201-5, which may be associated with streaming content traffic. In this example, session 201-5 is associated with an MTU size of 1500 bytes. As such, different UEs 101 may, in some situations, be associated with the same MTU configuration for the same traffic type.

Figure 3:
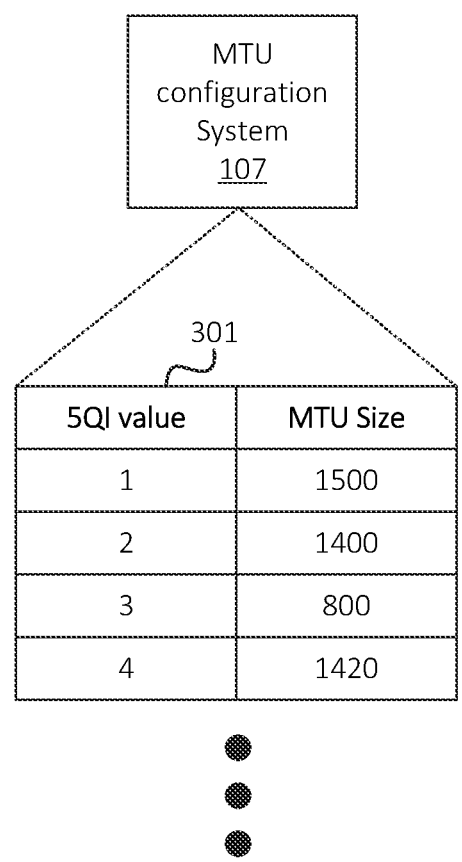
FIGS. 3-5 illustrate example mappings between UE and/or session information to particular MTU configurations, in accordance with some embodiments.

As discussed above, MCS 107 may maintain information mapping QoS values, slice information, and/or other attributes or parameters to particular MTU configurations. As shown in FIG. 3, for example, MCS 107 may maintain data structure 301, which may include a mapping between 5QI values and MTU configurations. Data structure 301 may indicate, for example, that if a requested communication session between UE 101 and core network 103 is associated with a 5QI value of 1, the MTU configuration for the communication session should include an MTU size of 1500 bytes. Data structure 301 may further indicate that if a communication session between UE 101 and core network 103 is associated with a 5QI value of 2, the MTU configuration for the communication session should include an MTU size of 1400 bytes, that if a communication session between UE 101 and core network 103 is associated with a 5QI value of 3, the MTU configuration for the communication session should include an MTU size of 800 bytes, that if a communication session between UE 101 and core network 103 is associated with a 5QI value of 4, the MTU configuration for the communication session should include an MTU size of 1420 bytes, and so on.

Figure 4:
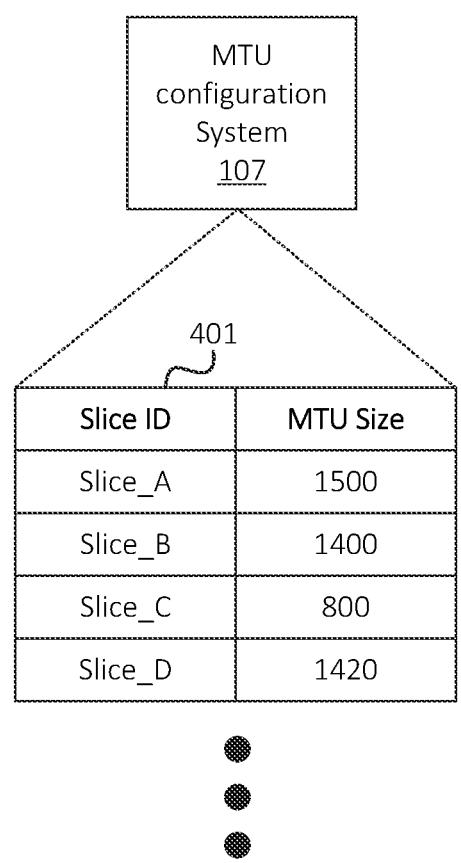

As another example, as shown in FIG. 4, MCS 107 may maintain data structure 401, which includes a mapping between slice identifiers and MTU configurations. In this figure, slice identifiers are represented as "Slice_A," "Slice_B," and so on. In practice, slice identifiers may include NSSAI values or other suitable identifiers of network slices. For example, if a communication session between UE 101 and core network 103 is associated with Slice_A, the MTU configuration for the communication session should be associated with an MTU size of 1500 bytes, and so on.

Figure 5:
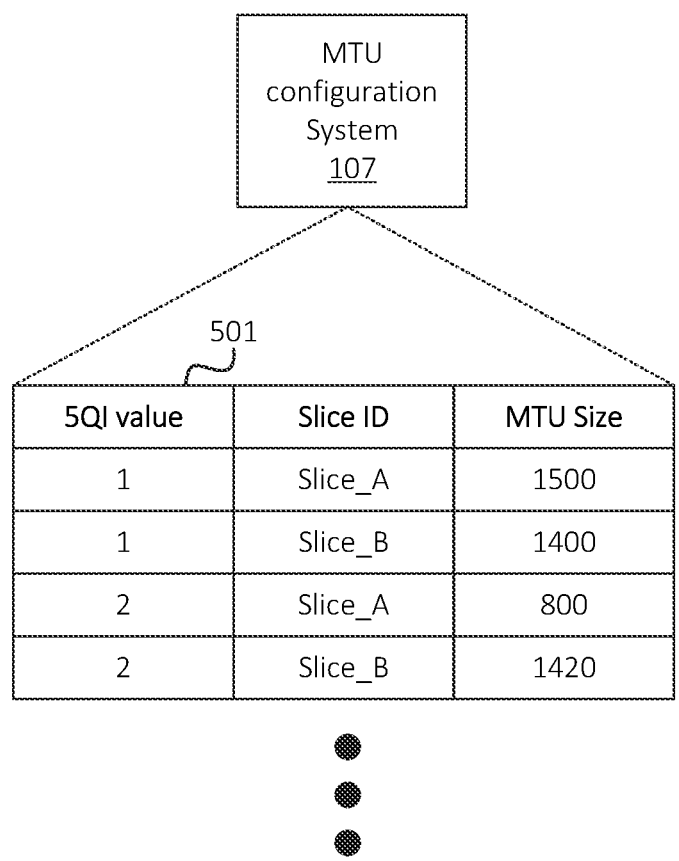

In some embodiments, combinations of multiple attributes may be mapped to a given MTU configuration. For example, as shown in FIG. 5, MCS 107 may maintain data structure 501, which indicates that 5QI values and slice identifiers may both be a factor based on which a given MTU configuration may be selected. For example, as shown, a 5QI value of 1 as well as a slice identifier of Slice_A may be associated with an MTU size of 1500, while a 5QI value of 1 with a slice identifier of Slice_B may be associated with an MTU size of 1400. For example, communication sessions associated with the same 5QI value but with different slice identifiers may be associated with different MTU configurations.

Figure 6:
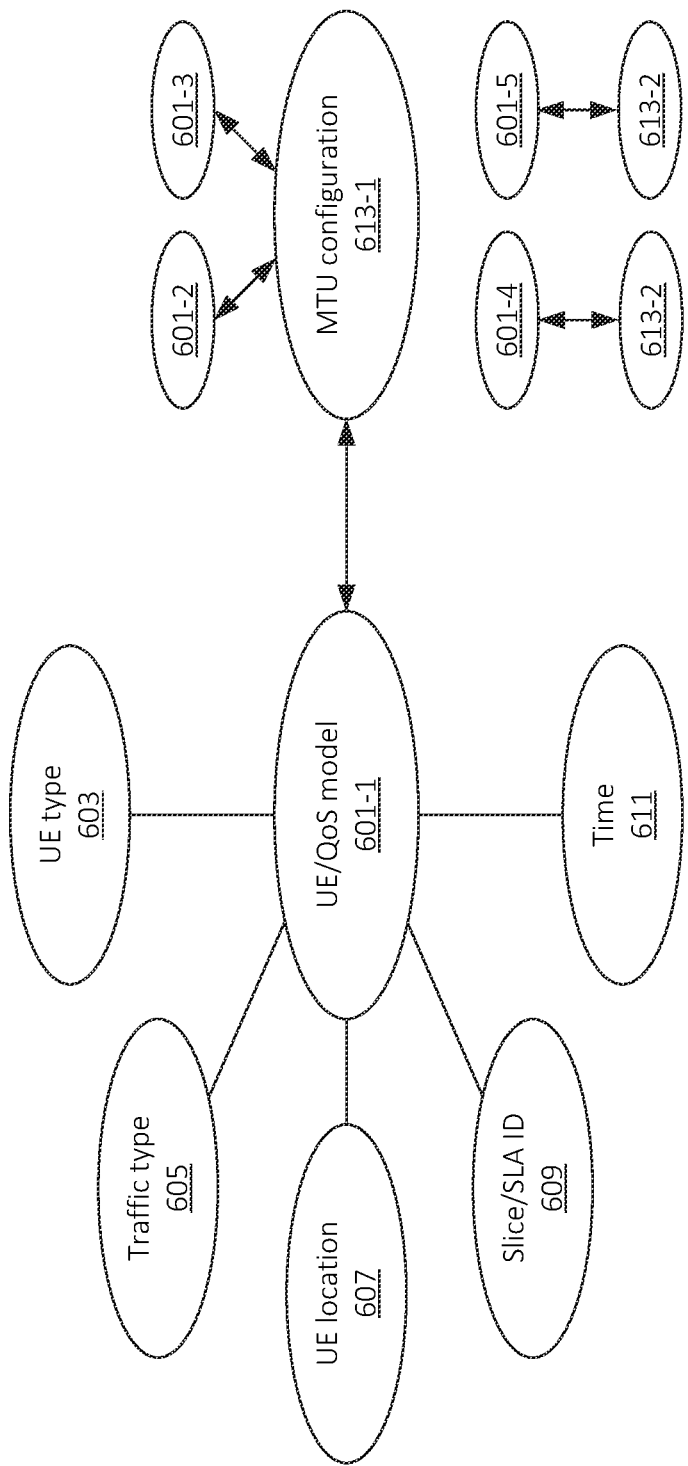
FIG. 6 illustrates an example association between UE models and MTU configurations, in accordance with some embodiments.

Additionally, or alternatively, as shown in FIG. 6, MCS 107 may generate, maintain, and/or refine one or more UE and/or QoS models 601 (referred to herein simply as "models 601" for the sake of brevity) that are associated with one or more MTU configurations 613. For example, as shown in FIG. 6, models 601-1, 601-2, and 601-3 may be associated with a first MTU configuration 613-1, model 601-4 may be associated with a second MTU configuration 613-2, and model 601-5 may be associated with a third MTU configuration 613-3. As similarly discussed above, MTU configurations 613 may indicate an MTU size for communications associated with a given communication session. Additionally, or alternatively, MTU configurations 613 may further specify conditions, parameters, rules, etc. based on which particular MTU sizes should be applied.

As further shown, models 601 may be associated with parameters and/or attributes, such as UE type 603, traffic type 605, UE location 607, slice (or other type of SLA or QoS level) identifier 609, time 611, and/or other types of parameters or attributes. As noted above, the parameters and/or attributes may be received by MCS 107 from one or more elements of network 103, such as an SMF, a PCF, a UDM, and/or some other suitable source.

UE type 603 may include, for example, an indication of a type of a particular UE 101, such as a mobile telephone, an IoT device, an M2M device, etc. In some embodiments, the type of UE 101 may include a make or model of UE 101, UE power class, and/or other attributes or capabilities of UE 101, such as a screen size, processor speed, etc.

Traffic type 605 may include a type, category, classification, label, etc. associated with a particular traffic type for a communication session. For example, traffic type 605 may include categories such as voice call traffic, data traffic, content streaming traffic, etc. Additionally, or alternatively, traffic type 605 may include, and/or may be based on, labels or identifiers such as APNs. Additionally, or alternatively, traffic type 605 may include, and/or may be based on, UE route selection policy ("URSP") rules.

UE location 607 may include a geographical location of UE 101 as determined by UE 101 (e.g., using Global Positioning System ("GPS") techniques or other suitable techniques) and/or by one or more base stations utilizing a wireless triangulation technique or other suitable technique. UE location 607 may include latitude and longitude coordinates, GPS coordinates, an address, a name of a city or other type of region, and/or other type of indication of a geographical location of UE 101.

Slice, SLA, QoS, etc. identifiers 609 may include one or more identifiers of one or more network slices, SLAs, QoS levels, etc. associated with UE 101. For example, such identifiers 609 may include a list of network slices that UE 101 is authorized to access. Additionally, or alternatively, identifiers 609 may include an identifier (e.g., a NSSAI value or other identifier) of a particular network slice that is actively being used for one or more communication sessions between UE 101 and core network 103. In some embodiments, identifiers 609 may include a 5QI value associated with one or more communication sessions (e.g., one or more PDU sessions) between UE 101 and core network 103.

Thus, identifiers 609 may include identifiers or other indications of network slices, SLAs, QoS levels, etc. that are associated with UE 101. For example, in situations where UE 101 is engaged in multiple sessions with 105, where each session is associated with a different network slice, SLA, etc., identifiers 609 may include identifiers of each different network slice, SLA, etc. In this manner, the same UE 101 may be associated with different MTU configurations 613 when engaging in different combinations of types of communication sessions with core network 103. For example, when engaging in a voice call, UE 101 may be associated with a first model 601-1 (and therefore with MTU configuration 613-1), while the same UE 101 may be associated with another model 601-4 (and therefore with MTU configuration 613-2) when engaging in a voice call and a file transfer.

Time 611 may refer to time of day, day of week, and/or other temporal characteristics. For example, during working hours (e.g., 9 AM-5 PM), UE 101 may be associated with the first model 601-1 (and therefore with MTU configuration 613-1), while the same UE 101 may be associated with the other model 601-4 (and therefore with MTU configuration 613-2) during non-working hours (e.g., 5 PM-9 AM).

In some embodiments, MCS 107 may refine models 601, MTU configurations 613, and/or respective correlations or associations between models 601 and MTU configurations 613 using AI/ML techniques or other suitable techniques. For example, MCS 107 may iteratively refine models 601, MTU configurations 613, and/or the correlations/associations between models 601 and MTU configurations 613 in order to determine an optimal MTU configuration 613 when given a UE 101 having particular attributes, or located in a particular location and/or at a particular time.

In some embodiments, model 601 may include additional and/or different information. For example, in some embodiments, model 601 may include identifiers of groups, categories, etc. of UEs 101. For example, a particular group of UEs 101 may include UEs 101 belonging to a particular organization or institution, may be associated with a particular access class (e.g., "first responders" or "fleet vehicles"), etc. In this manner, different models 601 may be applied to different groups, categories, etc. of UEs 101.

MTU configurations 613 are described herein in the context of a particular MTU size for a communication session. In some embodiments, a particular MTU configuration 613 may specify different MTU sizes for uplink and downlink communications via the same communication session. For example, a particular MTU configuration 613 may specify a first MTU size for downlink communications (e.g., traffic sent to a given UE) via a given communication session, and a second MTU size for uplink communications (e.g., traffic sent from the UE) via the communication session. In some embodiments, MTU configurations 613 may further include rules, conditions, etc. For example, a particular MTU configuration 613 may specify that a first MTU size is applicable to a communication session during a first time of day, while a second MTU size is applicable to the communication session during a second time of day.

Figure 7:
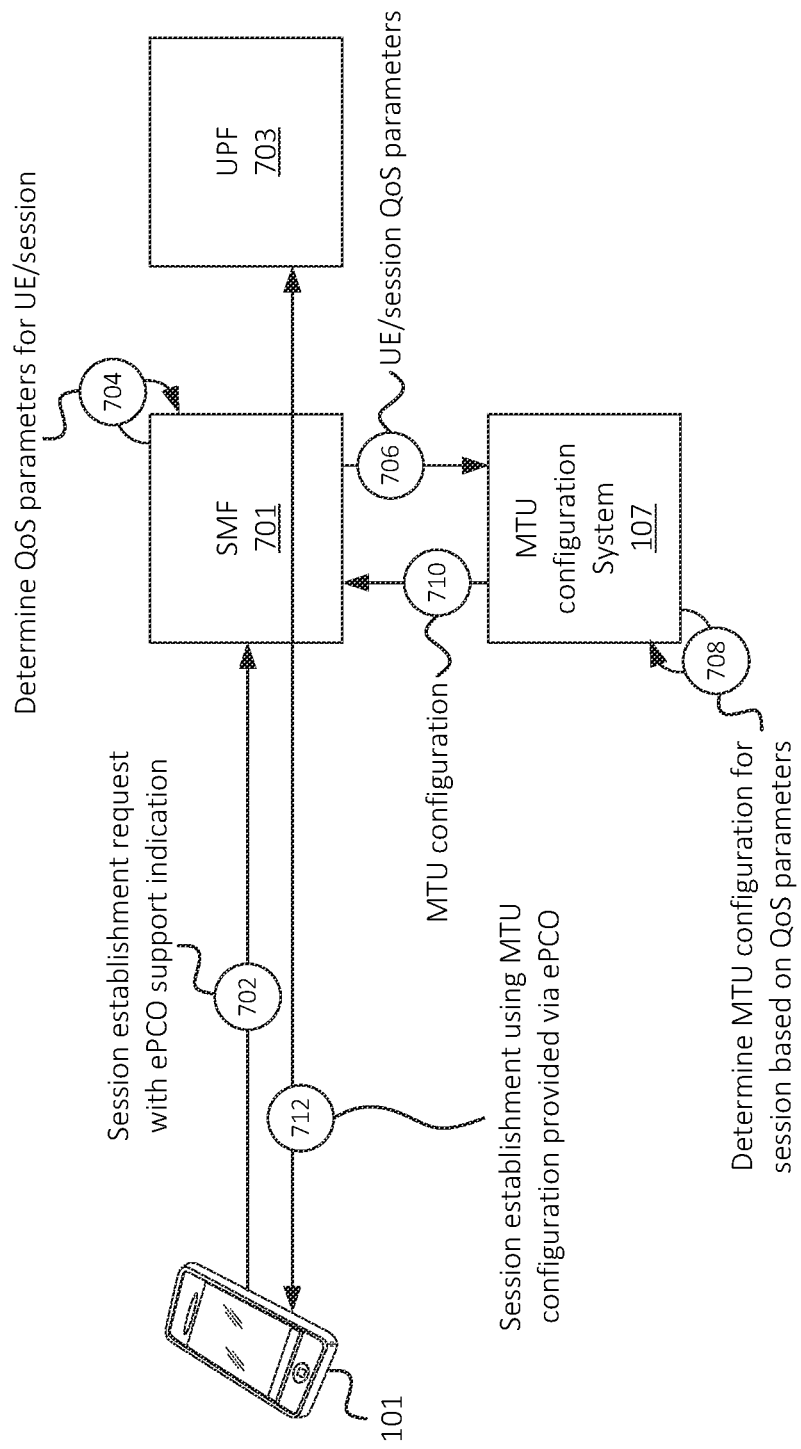
FIG. 7 illustrates an example of implementing an MTU configuration based on session Quality of Service ("QoS") parameters provided by a core network, in accordance with some embodiments.

FIG. 7 illustrates an example of determining or adjusting MTU configuration parameters based on information provided by one or more elements of core network 103, such as SMF 701. In some embodiments, UE 101 may communicate with SMF 701 via one or more other elements of core network 103, such as an AMF. UE 101 (e.g., via a RAN, an AMF or other suitable network element) may provide (at 702) in a session establishment request, such as a PDU session establishment request. In some embodiments, the session establishment request may indicate a particular protocol, such as an indication that extended Protocol Configuration Options ("ePCO") and/or some other suitable protocol is supported by UE 101. Additionally, or alternatively, as discussed above, SMF 701 may receive the session establishment request from some other device or system, and/or may otherwise determine that a communication session should be established between core network 103 (e.g., a user plane data element, such as UPF 703) and UE 101.

Based on receiving (at 702) the request (or otherwise based on determining that the session should be established), SMF 701 may determine (at 704) QoS parameters for the requested communication session associated with UE 101 (e.g., between UE 101 and UPF 703). SMF 701 may, for example, receive UE information from a UDM, may receive policy information from a PCF, and/or may receive other suitable information based on which SMF 701 may determine the QoS parameters associated with the requested session. In some embodiments, such parameters include a slice identifier, a 5QI, an APN, or other suitable QoS parameters or identifiers. In some embodiments, SMF 701 may determine other information associated with UE 101, such as UE type, UE location, etc. For example, SMF 701 may receive such information from a UDM or other suitable source.

SMF 701 may provide (at 706) the QoS parameters (and/or other information, as discussed above) associated with the session to MCS 107. As similarly discussed above, MCS 107 may determine (at 708) an MTU configuration for UE 101 based on the QoS parameters provided (at 706) by SMF 701, which may include a 5QI value, a slice identifier, and/or some other suitable value or identifier. MCS 107 may provide (at 710) the MTU configuration to SMF 701, which may proceed to complete (at 712) the session establishment with UE 101. In some embodiments, SMF 701 may provide (at 712) a PDU session establishment accept message with information such as a UPF identifier, session identifier, and/or other suitable information based on which UE 101 may communicate with core network 103 (e.g., UPF 703) via the established session. In some embodiments, SMF 701 may indicate, such as in an ePCO field of a PDU session establishment accept message (or other suitable message) the MTU configuration, such as MTU size associated with the session. UE 101 may accordingly maintain information associating the established communication session with the MTU size, and may utilize the MTU size when communicating with core network 103 via the session. For example, as discussed above, when sending data to core network 103 via the communication session, UE 101 may generate data packets up to the MTU size (e.g., not larger than the MTU size specified for the particular communication session). In this manner, the MTU configuration selected by MCS 107 may be implemented by UE 101 and by SMF 701.

Figure 8:
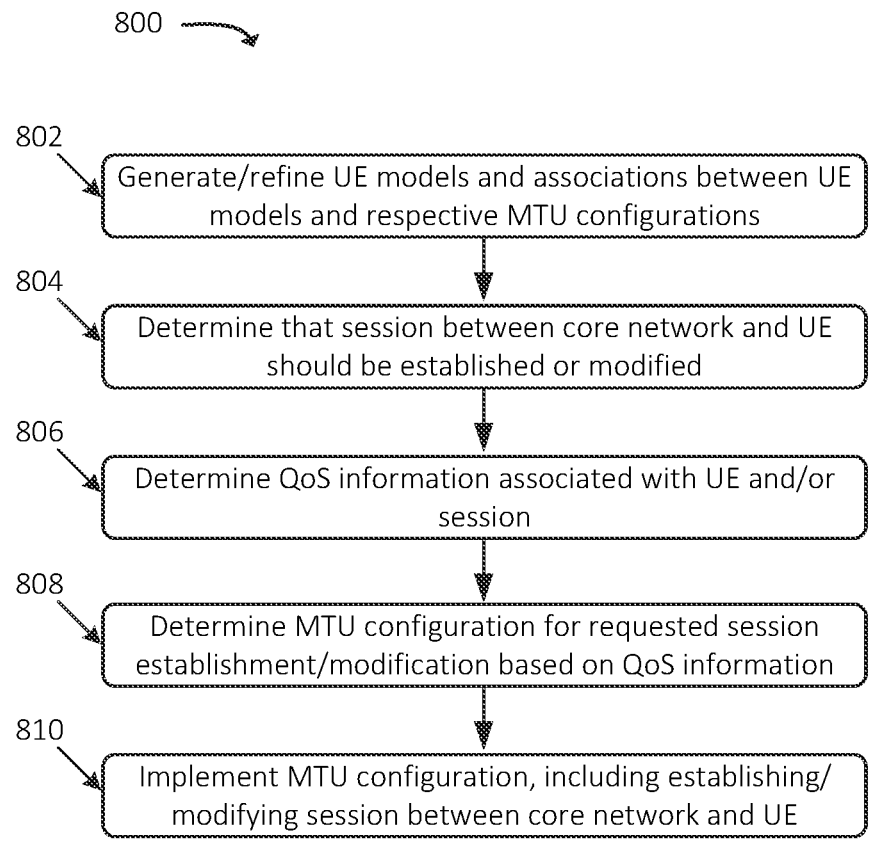
FIG. 8 illustrates an example process for implementing an MTU configuration for a particular UE based on attributes of the UE and/or QoS information associated with the UE, in accordance with some embodiments.

FIG. 8 illustrates an example process 800 for implementing an MTU configuration for a particular UE 101 based on attributes of UE 101 and/or QoS information associated with UE 101. In some embodiments, some or all of process 800 may be performed by MCS 107. In some embodiments, one or more other devices may perform some or all of process 800 in concert with MCS 107, such as QDS 105, SMF 701, etc.

As shown, process 800 may include generating and/or refining (at 802) one or more UE models and associations between UE models and respective MTU configurations. For example, as discussed above with respect to FIG. 6, MCS 107 may generate and/or refine models 601 and/or MTU configurations 613 over time using modeling techniques such as AI/ML techniques or other suitable techniques, in order to optimize performance, network efficiency, and/or other suitable metrics, objectives, and/or measures of yield. As such, given a set of input parameters (e.g., UE type, UE power class, UE location, traffic type associated with a requested communication session, network slice associated with a given UE 101 and/or a requested communication session, etc.), a particular MTU configuration 613 may be identified as optimal or otherwise associated with such set of input parameters.

Process 800 may further include determining (at 804) that a session between a core network and a UE should be established or modified. For example, MCS 107, QDS 105, and/or some other device or system may receive an indication (e.g., from SMF 701, from an AMF, and/or some other device or system) that UE 101 has requested the establishment of a communication session, such as a PDU session, an IP session, a user plane data session, etc. between UE 101 and core network 103. Additionally, or alternatively, MCS 107 may receive an indication that a session establishment between UE 101 and core network 103 has been requested or initiated by one or more elements of core network 103 and/or some other device or system. Additionally, or alternatively, MCS 107 may receive an indication that an existing session between UE 101 and core network 103 should be modified.

Process 800 may additionally include determining (at 806) QoS information associated with the UE and/or the session. For example, MCS 107 may receive information (e.g., from QDS 105, SMF 701, and/or some other device or system) indicating a network slice associated with UE 101 and/or a requested communication session between UE 101 and core network 103, a QoS identifier (e.g., a 5QI value or some other QoS identifier) associated with UE 101 and/or a requested communication session between UE 101 and core network 103, and/or other suitable QoS information. Additionally, or alternatively, MCS 107 may identify a particular model 601 associated with UE 101 and/or the communication session, based on attributes of UE 101 and/or the communication session (e.g., UE type 603, traffic type 605, UE location 607, network slice and/or SLA identifier 609, current time 611, etc.).

Process 800 may additionally include determining (at 808) an MTU configuration for UE 101 based on the QoS information and/or model 601. For example, as discussed above with respect to FIGS. 3-5, MCS 107 may identify one or more mappings between QoS identifiers, network slices, and/or other attributes of the requested session to MTU configurations. Additionally, or alternatively, MCS 107 may identify an association between a particular model 601 (e.g., with which UE 101 is associated) and a particular MTU configuration 613.

Process 800 may also include implementing (at 810) the MTU configuration. For example, MCS 107 may establish or modify the session (identified at 804) between UE 101 and core network 103 based on the determined MTU configuration. For example, as discussed above, MCS 107 and/or some other device or system may provide the MTU configuration, associated with the session, to one or more elements of core network 103, such as SMF 701, UPF 703, an AMF, and/or other suitable device or system. The MTU configuration may be provided (e.g., by MCS 107, SMF 701, etc.) to one or more endpoints or gateways for the session associated with core network 103, such as UPF 703. The MTU configuration may further be provided (e.g., by MCS 107, SMF 701, an AMF, etc.) to UE 101. As such, UE 101 and UPF 703 may both communicate, via the session, using the MTU parameters, which may specify MTU sizes for uplink and/or downlink transmissions between UE 101 and UPF 703.

According to embodiments described above, the MTU configuration of one or more communication sessions between UEs 101 and core network 103 may be able to be finely tuned based on particular traffic types, UE attributes (e.g., location, device type, etc.), UE groups or categories (e.g., "first responder," "enterprise user," etc.), performance metrics, or other goals, attributes, or measures of yield. In this manner, the user experience of users of such UEs 101 may be enhanced.

Figure 9:
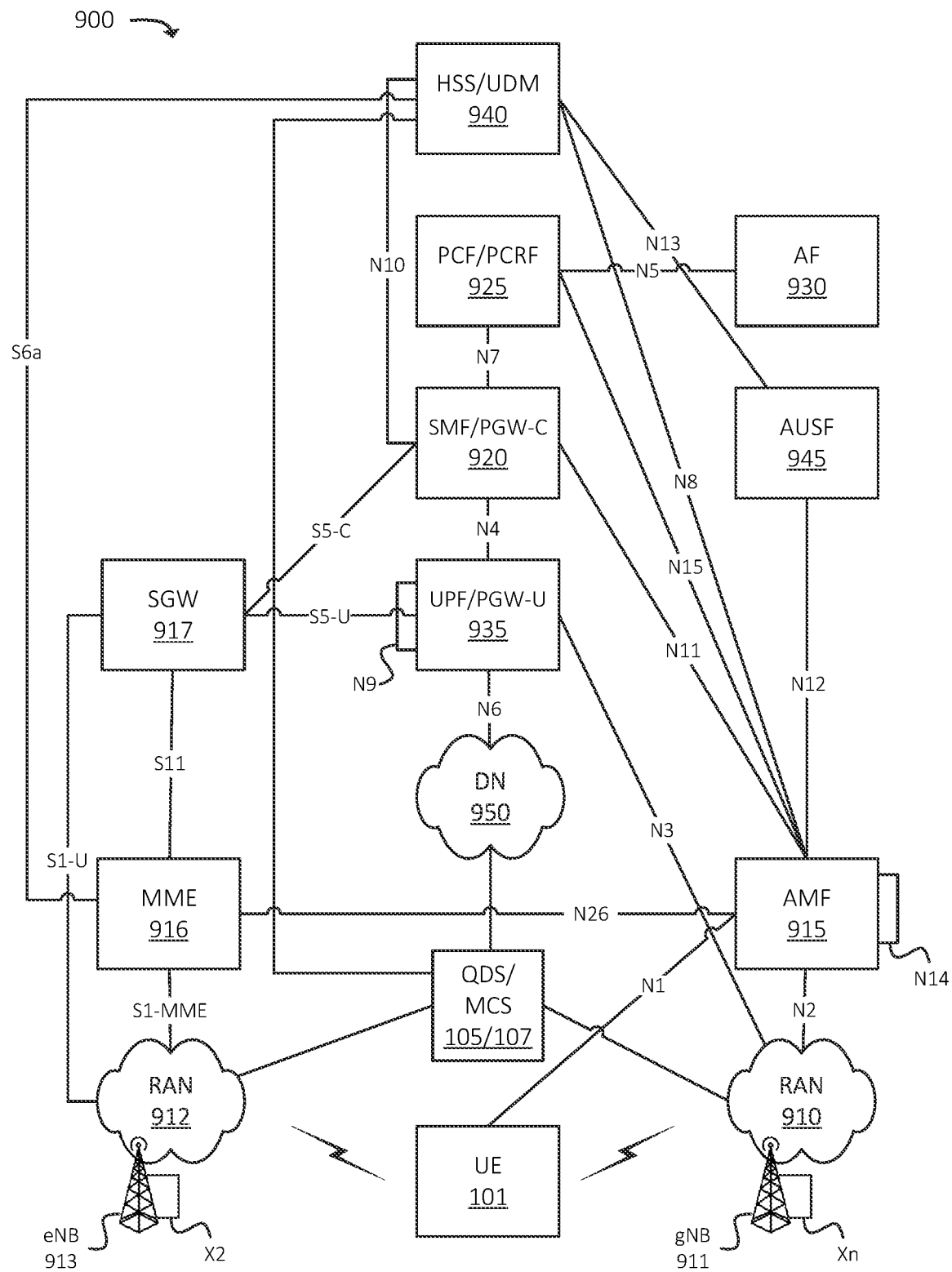
FIG. 9 illustrates an example environment in which one or more embodiments, described herein, may be implemented.

FIG. 9 illustrates an example environment 900, in which one or more embodiments may be implemented. In some embodiments, environment 900 may correspond to a 5G network, and/or may include elements of a 5G network. In some embodiments, environment 900 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 900 may include UE 101, RAN 910 (which may include one or more Next Generation Node Bs ("gNBs") 911), RAN 912 (which may include one or more evolved Node Bs ("eNBs") 913), and various network functions such as Access and Mobility Management Function ("AMF") 915, Mobility Management Entity ("MME") 916, Serving Gateway ("SGW") 917, Session Management Function ("SMF")/Packet Data Network ("PDN") Gateway ("PGW")-Control plane function ("PGW-C") 920, Policy Control Function ("PCF")/Policy Charging and Rules Function ("PCRF") 925, Application Function ("AF") 930, User Plane Function ("UPF")/PGW-User plane function ("PGW-U") 935, Home Subscriber Server ("HSS")/Unified Data Management ("UDM") 940, and Authentication Server Function ("AUSF") 945. Environment 900 may also include one or more networks, such as Data Network ("DN") 950. Environment 900 may include one or more additional devices or systems communicatively coupled to one or more networks (e.g., DN 950), such as QDS 105 and/or MCS 107.

The example shown in FIG. 9 illustrates one instance of each network component or function (e.g., one instance of SMF/PGW-C 920, PCF/PCRF 925, UPF/PGW-U 935, HSS/UDM 940, and/or AUSF 945). In practice, environment 900 may include multiple instances of such components or functions. For example, in some embodiments, environment 900 may include multiple "slices" of a core network, where each slice includes a discrete set of network functions (e.g., one slice may include a first instance of SMF/PGW-C 920, PCF/PCRF 925, UPF/PGW-U 935, HSS/UDM 940, and/or AUSF 945, while another slice may include a second instance of SMF/PGW-C 920, PCF/PCRF 925, UPF/PGW-U 935, HSS/UDM 940, and/or AUSF 945). The different slices may provide differentiated levels of service, such as service in accordance with different QoS parameters.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. Alternatively, or additionally, one or more of the devices of environment 900 may perform one or more network functions described as being performed by another one or more of the devices of environment 900. Devices of environment 900 may interconnect with each other and/or other devices via wired connections, wireless connections, or a combination of wired and wireless connections. In some implementations, one or more devices of environment 900 may be physically integrated in, and/or may be physically attached to, one or more other devices of environment 900.

UE 101 may include a computation and communication device, such as a wireless mobile communication device that is capable of communicating with RAN 910, RAN 912, and/or DN 950. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, a wearable device, an M2M device, or the like), or another type of mobile computation and communication device. UE 101 may send traffic to and/or receive traffic (e.g., user plane traffic) from DN 950 via RAN 910, RAN 912, and/or UPF/PGW-U 935.

RAN 910 may be, or may include, a 5G RAN that includes one or more base stations (e.g., one or more gNBs 911), via which UE 101 may communicate with one or more other elements of environment 900. UE 101 may communicate with RAN 910 via an air interface (e.g., as provided by gNB 911). For instance, RAN 910 may receive traffic (e.g., voice call traffic, data traffic, messaging traffic, signaling traffic, etc.) from UE 101 via the air interface, and may communicate the traffic to UPF/PGW-U 935, and/or one or more other devices or networks. Similarly, RAN 910 may receive traffic intended for UE 101 (e.g., from UPF/PGW-U 935, AMF 915, and/or one or more other devices or networks) and may communicate the traffic to UE 101 via the air interface.

RAN 912 may be, or may include, a LTE RAN that includes one or more base stations (e.g., one or more eNBs 913), via which UE 101 may communicate with one or more other elements of environment 900. UE 101 may communicate with RAN 912 via an air interface (e.g., as provided by eNB 913). For instance, RAN 910 may receive traffic (e.g., voice call traffic, data traffic, messaging traffic, signaling traffic, etc.) from UE 101 via the air interface, and may communicate the traffic to UPF/PGW-U 935, and/or one or more other devices or networks. Similarly, RAN 910 may receive traffic intended for UE 101 (e.g., from UPF/PGW-U 935, SGW 917, and/or one or more other devices or networks) and may communicate the traffic to UE 101 via the air interface.

AMF 915 may include one or more devices, systems, Virtualized Network Functions ("VNFs"), Cloud-Native Network Functions ("CNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 910 and/or gNBs 911, and/or to perform other operations. In some embodiments, the 5G network may include multiple AMFs 915, which communicate with each other via the N14 interface (denoted in FIG. 9 by the line marked "N14" originating and terminating at AMF 915).

MME 916 may include one or more devices, systems, VNFs, CNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 912 and/or eNBs 913, and/or to perform other operations.

SGW 917 may include one or more devices, systems, VNFs, CNFs, etc., that aggregate traffic received from one or more eNBs 913 and send the aggregated traffic to an external network or device via UPF/PGW-U 935. Additionally, SGW 917 may aggregate traffic received from one or more UPF/PGW-Us 935 and may send the aggregated traffic to one or more eNBs 913. SGW 917 may operate as an anchor for the user plane during inter-eNB handovers and as an anchor for mobility between different telecommunication networks or RANs (e.g., RANs 910 and 912).

SMF/PGW-C 920 may include one or more devices, systems, VNFs, CNFs, etc., that gather, process, store, and/or provide information in a manner described herein. SMF/PGW-C 920 may, for example, facilitate the establishment of communication sessions on behalf of UE 101. In some embodiments, the establishment of communications sessions may be performed in accordance with one or more policies provided by PCF/PCRF 925. In some embodiments, SMF/PGW-C 920 may include, may implement, may be communicatively coupled to, and/or may otherwise be associated with SMF 701.

PCF/PCRF 925 may include one or more devices, systems, VNFs, CNFs, etc., that aggregate information to and from the 5G network and/or other sources. PCF/PCRF 925 may receive information regarding policies and/or subscriptions from one or more sources, such as subscriber databases and/or from one or more users (such as, for example, an administrator associated with PCF/PCRF 925).

AF 930 may include one or more devices, systems, VNFs, CNFs, etc., that receive, store, and/or provide information that may be used in determining parameters (e.g., quality of service parameters, charging parameters, or the like) for certain applications.

UPF/PGW-U 935 may include one or more devices, systems, VNFs, CNFs, etc., that receive, store, and/or provide data (e.g., user plane data). For example, UPF/PGW-U 935 may receive user plane data (e.g., voice call traffic, data traffic, etc.), destined for UE 101, from DN 950, and may forward the user plane data toward UE 101 (e.g., via RAN 910, SMF/PGW-C 920, and/or one or more other devices). In some embodiments, multiple UPFs 935 may be deployed (e.g., in different geographical locations), and the delivery of content to UE 101 may be coordinated via the N9 interface (e.g., as denoted in FIG. 9 by the line marked "N9" originating and terminating at UPF/PGW-U 935). Similarly, UPF/PGW-U 935 may receive traffic from UE 101 (e.g., via RAN 910, SMF/PGW-C 920, and/or one or more other devices), and may forward the traffic toward DN 950. In some embodiments, UPF/PGW-U 935 may communicate (e.g., via the N4 interface) with SMF/PGW-C 920, regarding user plane data processed by UPF/PGW-U 935. In some embodiments, UPF/PGW-U 935 may include, may implement, may be communicatively coupled to, and/or may otherwise be associated with UPF 703.

HSS/UDM 940 and AUSF 945 may include one or more devices, systems, VNFs, CNFs, etc., that manage, update, and/or store, in one or more memory devices associated with AUSF 945 and/or HSS/UDM 940, profile information associated with a subscriber. AUSF 945 and/or HSS/UDM 940 may perform authentication, authorization, and/or accounting operations associated with the subscriber and/or a communication session with UE 101.

DN 950 may include one or more wired and/or wireless networks. For example, DN 950 may include an Internet Protocol ("IP")-based PDN, a wide area network ("WAN") such as the Internet, a private enterprise network, and/or one or more other networks. UE 101 may communicate, through DN 950, with data servers, other UEs 101, and/or to other servers or applications that are coupled to DN 950. DN 950 may be connected to one or more other networks, such as a public switched telephone network ("PSTN"), a public land mobile network ("PLMN"), and/or another network. DN 950 may be connected to one or more devices, such as content providers, applications, web servers, and/or other devices, with which UE 101 may communicate.

Figure 10:
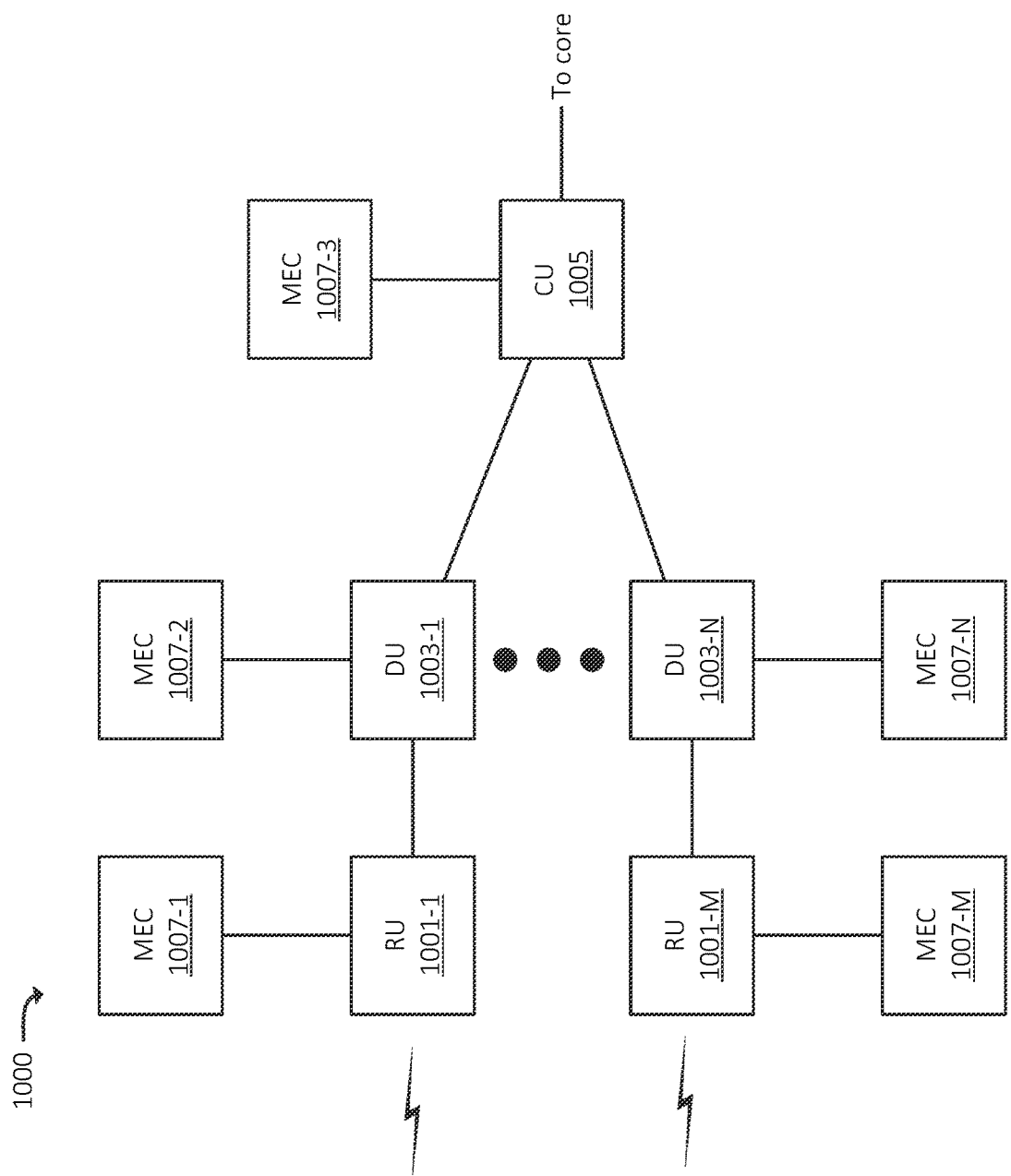
FIG. 10 illustrates an example arrangement of a RAN, in accordance with some embodiments.

FIG. 10 illustrates an example Distributed Unit ("DU") network 1000, which may be included in and/or implemented by one or more RANs (e.g., RAN 910, RAN 912, or some other RAN). In some embodiments, a particular RAN may include one DU network 1000. In some embodiments, a particular RAN may include multiple DU networks 1000. In some embodiments, DU network 1000 may correspond to a particular gNB 911 of a 5G RAN (e.g., RAN 910). In some embodiments, DU network 1000 may correspond to multiple gNBs 911. In some embodiments, DU network 1000 may correspond to one or more other types of base stations of one or more other types of RANs. As shown, DU network 1000 may include Central Unit ("CU") 1005, one or more Distributed Units ("DUs") 1003-1 through 1003-N (referred to individually as "DU 1003," or collectively as "DUs 1003"), and one or more Radio Units ("RUs") 1001-1 through 1001-M (referred to individually as "RU 1001," or collectively as "RUs 1001").

CU 1005 may communicate with a core of a wireless network (e.g., may communicate with one or more of the devices or systems described above with respect to FIG. 9, such as AMF 915 and/or UPF/PGW-U 935). In the uplink direction (e.g., for traffic from UEs 101 to a core network), CU 1005 may aggregate traffic from DUs 1003, and forward the aggregated traffic to the core network. In some embodiments, CU 1005 may receive traffic according to a given protocol (e.g., Radio Link Control ("RLC")) from DUs 1003, and may perform higher-layer processing (e.g., may aggregate/process RLC packets and generate Packet Data Convergence Protocol ("PDCP") packets based on the RLC packets) on the traffic received from DUs 1003.

In accordance with some embodiments, CU 1005 may receive downlink traffic (e.g., traffic from the core network) for a particular UE 101, and may determine which DU(s) 1003 should receive the downlink traffic. DU 1003 may include one or more devices that transmit traffic between a core network (e.g., via CU 1005) and UE 101 (e.g., via a respective RU 1001). DU 1003 may, for example, receive traffic from RU 1001 at a first layer (e.g., physical ("PHY") layer traffic, or lower PHY layer traffic), and may process/aggregate the traffic to a second layer (e.g., upper PHY and/or RLC). DU 1003 may receive traffic from CU 1005 at the second layer, may process the traffic to the first layer, and provide the processed traffic to a respective RU 1001 for transmission to UE 101.

RU 1001 may include hardware circuitry (e.g., one or more RF transceivers, antennas, radios, and/or other suitable hardware) to communicate wirelessly (e.g., via an RF interface) with one or more UEs 101, one or more other DUs 1003 (e.g., via RUs 1001 associated with DUs 1003), and/or any other suitable type of device. In the uplink direction, RU 1001 may receive traffic from UE 101 and/or another DU 1003 via the RF interface and may provide the traffic to DU 1003. In the downlink direction, RU 1001 may receive traffic from DU 1003, and may provide the traffic to UE 101 and/or another DU 1003.

RUs 1001 may, in some embodiments, be communicatively coupled to one or more Multi-Access/Mobile Edge Computing ("MEC") devices, referred to sometimes herein simply as "MECs" 1007. For example, RU 1001-1 may be communicatively coupled to MEC 1007-1, RU 1001-M may be communicatively coupled to MEC 1007-M, DU 1003-1 may be communicatively coupled to MEC 1007-2, DU 1003-N may be communicatively coupled to MEC 1007-N, CU 1005 may be communicatively coupled to MEC 1007-3, and so on. MECs 1007 may include hardware resources (e.g., configurable or provisionable hardware resources) that may be configured to provide services and/or otherwise process traffic to and/or from UE 101, via a respective RU 1001.

For example, RU 1001-1 may route some traffic, from UE 101, to MEC 1007-1 instead of to a core network (e.g., via DU 1003 and CU 1005). MEC 1007-1 may process the traffic, perform one or more computations based on the received traffic, and may provide traffic to UE 101 via RU 1001-1. In this manner, ultra-low latency services may be provided to UE 101, as traffic does not need to traverse DU 1003, CU 1005, and an intervening backhaul network between DU network 1000 and the core network. In some embodiments, MEC 1007 may include, and/or may implement, some or all of the functionality described above with respect to QDS 105, MCS 107, UPF 935, and/or one or more other devices, systems, VNFs, CNFs, etc.

Figure 11:
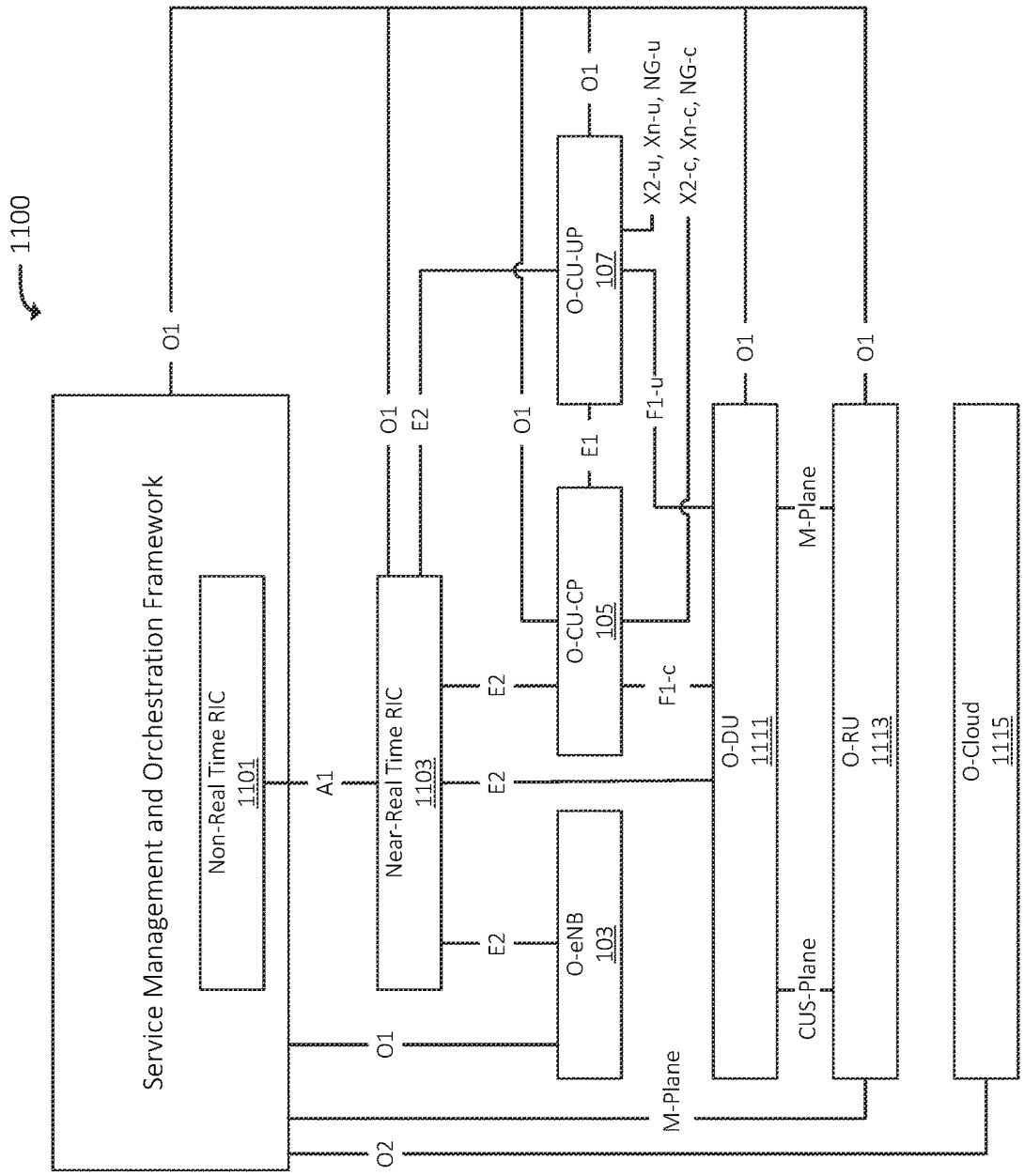
FIG. 11 illustrates an example arrangement of an Open RAN ("O-RAN") environment in which one or more embodiments, described herein, may be implemented.

FIG. 11 illustrates an example O-RAN environment 1100, which may correspond to RAN 910, RAN 912, and/or DU network 1000. For example, RAN 910, RAN 912, and/or DU network 1000 may include one or more instances of O-RAN environment 1100, and/or one or more instances of O-RAN environment 1100 may implement RAN 910, RAN 912, DU network 1000, and/or some portion thereof. As shown, O-RAN environment 1100 may include Non-Real Time Radio Intelligent Controller ("RIC") 1101, Near-Real Time RIC 1103, O-eNB 1105, O-CU-Control Plane ("O-CU-CP") 1105, O-CU-User Plane ("O-CU-UP") 1107, O-DU 1111, O-RU 1113, and O-Cloud 1115. In some embodiments, O-RAN environment 1100 may include additional, fewer, different, and/or differently arranged components.

In some embodiments, some or all of the elements of O-RAN environment 1100 may be implemented by one or more configurable or provisionable resources, such as virtual machines, cloud computing systems, physical servers, and/or other types of configurable or provisionable resources. In some embodiments, some or all of O-RAN environment 1100 may be implemented by, and/or communicatively coupled to, one or more MECs 1007.

Non-Real Time RIC 1101 and Near-Real Time RIC 1103 may receive performance information (and/or other types of information) from one or more sources, and may configure other elements of O-RAN environment 1100 based on such performance or other information. For example, Near-Real Time RIC 1103 may receive performance information, via one or more E2 interfaces, from O-eNB 1105, O-CU-CP 1105, and/or O-CU-UP 1107, and may modify parameters associated with O-eNB 1105, O-CU-CP 1105, and/or O-CU-UP 1107 based on such performance information. In some embodiments, such parameters may include MTU configuration information, as discussed above. For example, in some embodiments, Near-Real Time RIC 1103 may perform some or all of the functionality described above with respect to QDS 105 and/or MCS 107.

Non-Real Time MC 1101 may receive performance information associated with O-eNB 1105, O-CU-CP 1105, O-CU-UP 1107, and/or one or more other elements of O-RAN environment 1100 and may utilize machine learning and/or other higher level computing or processing to determine modifications to the configuration of O-eNB 1105, O-CU-CP 1105, O-CU-UP 1107, and/or other elements of O-RAN environment 1100. In some embodiments, Non-Real Time MC 1101 may generate machine learning models based on performance information associated with O-RAN environment 1100 or other sources, and may provide such models to Near-Real Time RIC 1103 for implementation.

O-eNB 1105 may perform functions similar to those described above with respect to eNB 913. For example, O-eNB 1105 may facilitate wireless communications between UE 101 and a core network. O-CU-CP 1105 may perform control plane signaling to coordinate the aggregation and/or distribution of traffic via one or more DUs 1003, which may include and/or be implemented by one or more O-DUs 1111, and O-CU-UP 1107 may perform the aggregation and/or distribution of traffic via such DUs 1003 (e.g., O-DUs 1111). O-DU 1111 may be communicatively coupled to one or more RUs 1001, which may include and/or may be implemented by one or more O-RUs 1113. In some embodiments, O-Cloud 1115 may include or be implemented by one or more MECs 1007, which may provide services, and may be communicatively coupled, to O-CU-CP 1105, O-CU-UP 1107, O-DU 1111, and/or O-RU 1113 (e.g., via an O1 and/or O2 interface).

Figure 12:
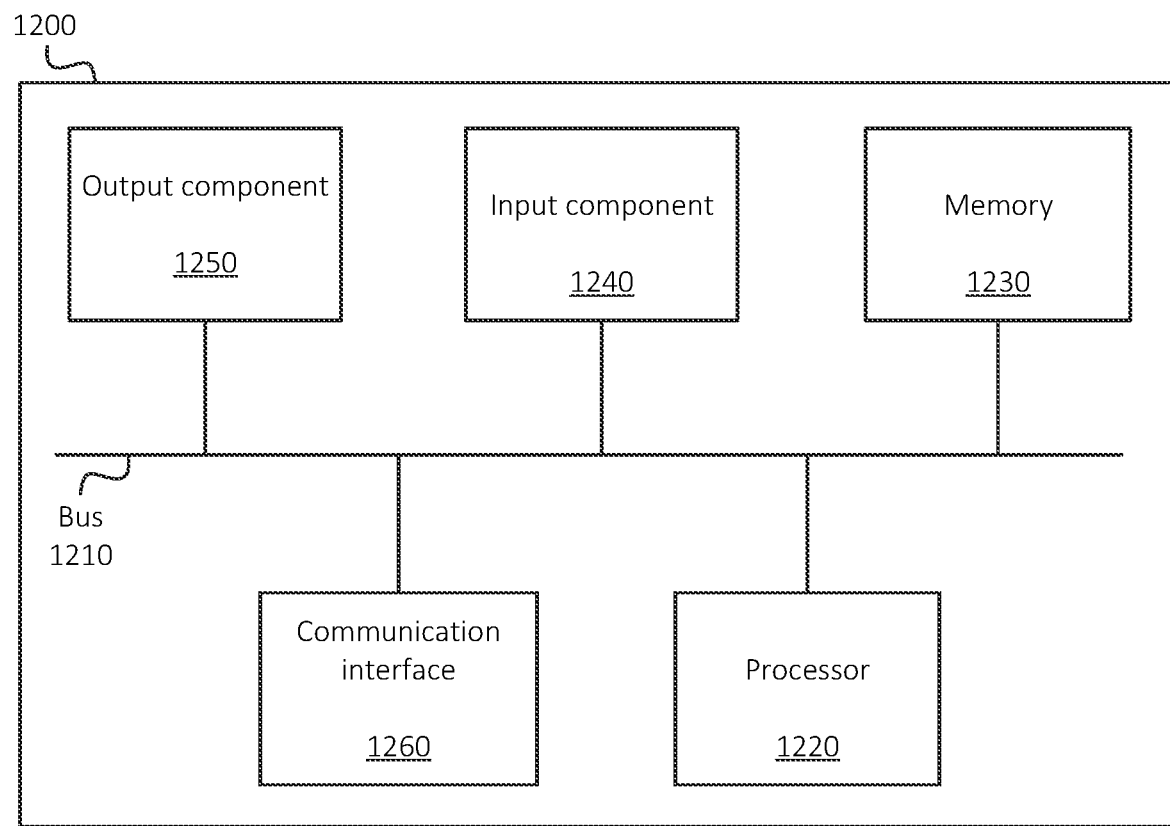
FIG. 12 illustrates example components of one or more devices, in accordance with one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. In some embodiments, processor 1220 may be or may include one or more hardware processors. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200 and/or other receives or detects input from a source external to 1240, such as a touchpad, a touchscreen, a keyboard, a keypad, a button, a switch, a microphone or other audio input component, etc. In some embodiments, input component 1240 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-8), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
identify a first requested communication session between a first User Equipment ("UE") and a network;
identify a first set of attributes associated with the first UE;
identify particular Quality of Service ("QoS") information associated with at least one of the UE or the first requested communication session, wherein the particular QoS information includes a particular QoS parameter;
determine, based on the first set of attributes associated with the first UE and further based on the particular QoS parameter, a first maximum transmission unit ("MTU") configuration for the first requested communication session;
identify a second requested communication session between a second UE and the network, wherein the second requested communication session is associated with the same particular QoS parameter;
identify a second set of attributes associated with the second UE;
determine, based on the second set of attributes associated with the second UE and further based on the same particular QoS parameter, a second MTU configuration for the second requested communication session, wherein the second MTU configuration is different from the first MTU configuration; and
implement the determined first and second MTU configurations, wherein the first UE and the network communicate with each other according to the implemented first MTU configuration, and wherein the second UE and the network communicate with each other according to the implemented second MTU configuration.

2. The device of claim 1, wherein the first QoS parameter includes at least one of:
a Fifth Generation ("5G") QOS identifier ("5QI") value associated with the first requested communication session, or
a slice identifier associated with the first requested communication session.

3. The device of claim 2, wherein the at least one of the 5QI value or the slice identifier are received from at least one of:
a Session Management Function ("SMF"), or
an Access and Mobility Management Function ("AMF").

4. The device of claim 1, wherein the first requested communication session includes a first protocol data unit ("PDU") session, and wherein the second requested communication session includes a second PDU session.

5. The device of claim 4, wherein the first requested communication session is identified based on a PDU session establishment request provided by the first UE.

6. The device of claim 1, wherein the one or more processors are further configured to:
maintain one or more models that correlate particular sets of UE attributes to particular MTU configurations; and
select, based on attributes of the first UE, a particular model of the one or more models, wherein determining the first MTU configuration for the first UE is further based on identifying that the first MTU configuration is associated with the particular model.

7. The device of claim 1, wherein the one or more processors are further configured to:
identify a third communication session between the first UE and the network; and
implement a third MTU configuration, that is different from the first MTU configuration, with respect to the third communication session between the first UE and the network,
wherein the first and third communication sessions between the UE and the network are concurrently active.

8. A non-transitory computer-readable medium, storing a plurality of processor-executable instructions to:
identify a first requested communication session between a first User Equipment ("UE") and a network;
identify a first set of attributes associated with the first UE;
identify particular Quality of Service ("QoS") information associated with at least one of the UE or the first requested communication session, wherein the particular QoS information includes a particular QoS parameter;
determine, based on the first set of attributes associated with the first UE and further based on the particular QoS parameter, a first maximum transmission unit ("MTU") configuration for the first requested communication session;
identify a second requested communication session between a second UE and the network, wherein the second requested communication session is associated with the same particular QoS parameter;
identify a second set of attributes associated with the second UE;
determine, based on the second set of attributes associated with the second UE and further based on the same particular QoS parameter, a second MTU configuration for the second requested communication session, wherein the second MTU configuration is different from the first MTU configuration; and
implement the determined first and second MTU configurations, wherein the first UE and the network communicate with each other according to the implemented first MTU configuration, and wherein the second UE and the network communicate with each other according to the implemented second MTU configuration.

9. The non-transitory computer-readable medium of claim 8, wherein the first QoS parameter includes at least one of:
a Fifth Generation ("5G") QoS identifier ("5QI") value associated with the first requested communication session, or
a slice identifier associated with the first requested communication session.

10. The non-transitory computer-readable medium of claim 9, wherein the at least one of the 5QI value or the slice identifier are received from at least one of:
a Session Management Function ("SMF"), or
an Access and Mobility Management Function ("AMF").

11. The non-transitory computer-readable medium of claim 8, wherein the first requested communication session includes a first protocol data unit ("PDU") session, and wherein the second requested communication session includes a second PDU session.

12. The non-transitory computer-readable medium of claim 8, wherein the first requested communication session is identified based on a protocol data unit ("PDU") session establishment request provided by the UE.

13. The non-transitory computer-readable medium of claim 8, wherein the plurality of processor-executable instructions further include processor-executable instructions to:
maintain one or more models that correlate particular sets of UE attributes to particular MTU configurations; and
select, based on attributes of the first UE, a particular model of the one or more models, wherein determining the first MTU configuration for the first UE is further based on identifying that the first MTU configuration is associated with the particular model.

14. The non-transitory computer-readable medium of claim 8, wherein the plurality of processor-executable instructions further include processor-executable instructions to:
identify a third communication session between the first UE and the network; and
implement a third MTU configuration, that is different from the first MTU configuration, with respect to the third communication session between the first UE and the network,
wherein the first and third communication sessions between the UE and the network are concurrently active.

15. A method, comprising:
identifying a first requested communication session between a first User Equipment ("UE") and a network;
identifying a first set of attributes associated with the first UE;
identifying particular Quality of Service ("QoS") information associated with at least one of the UE or the first requested communication session, wherein the particular QoS information includes a particular QoS parameter;
determining, based on the first set of attributes associated with the first UE and further based on the particular QoS parameter, a first maximum transmission unit ("MTU") configuration for the first requested communication session;
identifying a second requested communication session between a second UE and the network, wherein the second requested communication session is associated with the same particular QoS parameter;
identifying a second set of attributes associated with the second UE;
determining, based on the second set of attributes associated with the second UE and further based on the same particular QoS parameter, a second MTU configuration for the second requested communication session, wherein the second MTU configuration is different from the first MTU configuration; and
implementing the determined first and second MTU configurations, wherein the first UE and the network communicate with each other according to the implemented first MTU configuration, and wherein the second UE and the network communicate with each other according to the implemented second MTU configuration.

16. The method of claim 15, wherein the first QoS parameter includes at least one of:
a Fifth Generation ("5G") QoS identifier ("5QI") value associated with the first requested communication session, or
a slice identifier associated with the first requested communication session.

17. The method of claim 15, wherein the first requested communication session includes a first protocol data unit ("PDU") session, and wherein the second requested communication session includes a second PDU session.

18. The method of claim 17, wherein the first requested communication session is identified based on a first PDU session establishment request provided by the UE.

19. The method of claim 15, further comprising:
maintaining one or more models that correlate particular sets of UE attributes to particular MTU configurations; and
selecting, based on attributes of the first UE, a particular model of the one or more models, wherein determining the first MTU configuration for the first UE is further based on identifying that the first MTU configuration is associated with the particular model.

20. The method of claim 15, further comprising:
identifying a third communication session between the first UE and the network; and
implementing a third MTU configuration, that is different from the first MTU configuration, with respect to the third communication session between the first UE and the network,
wherein the first and third communication sessions between the UE and the network are concurrently active.

* * * * *